(12) United States Patent
Amemiya

(10) Patent No.: US 8,511,161 B2
(45) Date of Patent: Aug. 20, 2013

(54) PHYSICAL AMOUNT DETECTING DEVICE

(75) Inventor: Masaki Amemiya, Minami-Minowa (JP)

(73) Assignee: Seiko Epson Corporation (JP)

( * ) Notice: Subject to any disclaimer, the term of this patent is extended or adjusted under 35 U.S.C. 154(b) by 324 days.

(21) Appl. No.: 12/973,224

(22) Filed: Dec. 20, 2010

(65) Prior Publication Data

US 2011/0179867 A1 Jul. 28, 2011

(30) Foreign Application Priority Data

Jan. 28, 2010 (JP) ................................. 2010-016505
Oct. 22, 2010 (JP) ................................. 2010-237413

(51) Int. Cl.
*G01C 19/56* (2012.01)
(52) U.S. Cl.
USPC ..................................... 73/504.12; 73/504.16
(58) Field of Classification Search
USPC .............................. 73/504.12, 504.15, 504.16
See application file for complete search history.

(56) References Cited

U.S. PATENT DOCUMENTS 6,490,925 B2 * 12/2002 Inoue et al. ................ 73/504.16
2005/0284223 A1 12/2005 Karaki et al.

FOREIGN PATENT DOCUMENTS

| JP | 2005-062160 | 3/2005 |
| JP | 2008-26110 | 2/2008 |
| JP | 2008-058062 | 3/2008 |

* cited by examiner

*Primary Examiner* — John Chapman, Jr.
(74) *Attorney, Agent, or Firm* — Harness, Dickey & Pierce, P.L.C.

(57) ABSTRACT

A physical amount detecting device includes: one pair of first driving vibration arms are bending-vibrated in a Z-axis direction with a first phase, one pair of second driving vibration arms are bending-vibrated in the Z-axis direction with a second phase that is a reverse phase of the first phase, the one pair of the first driving vibration arms and the one pair of the second driving vibrating arms are vibrated in a Y-axis direction with opposite phases by a Coriolis force that is generated in accordance with angular velocity of a X-axis rotation, and one pair of detection vibration arms are bending-vibrated in the X-axis direction with opposite phases in accordance with vibration of the one pair of the first driving vibration arms and the one pair of the second driving vibration arms in the Y-axis direction.

4 Claims, 7 Drawing Sheets

PHYSICAL AMOUNT DETECTING DEVICE

BACKGROUND

1. Technical Field

The present invention relates to a physical amount detecting device, a physical amount detecting apparatus, and an electronic apparatus.

2. Related Art

As angular velocity sensors used for detecting the rotation angular velocity of a rotation system, vibration-type piezoelectric gyroscopes are used in which a piezoelectric vibrating reed is housed in a container. The vibration-type piezoelectric gyroscopes are used for detecting the shake and the like in car navigation systems and still cameras.

As the piezoelectric vibrating reeds used in the vibration-type piezoelectric gyroscopes, for example, double T-type piezoelectric vibrating reeds, which, for example, have a thickness in the Z-axis direction, including: one pair of connection arms that extend from a base portion to both sides along the X axis; one pair of detection vibration arms that extend from the base portion to both sides along the Y axis; and one driving vibration arm that extends from each connection arm to both sides along the Y axis can be used (for example, see JP-A-2005-62160). Such double T-type piezoelectric vibrating reeds can detect the angular velocity of Z-axis rotation by performing a bending vibration for the driving vibration arm on the XY plane.

SUMMARY

An advantage of some aspects of the invention is that it provides a physical amount detecting device that has a double T-type piezoelectric vibrating reed having a thickness in the Z-axis direction and can detect the angular velocity of X-axis rotation. In addition, another advantage of some aspects of the invention is that it provides a physical amount detecting apparatus that includes the physical amount detecting device.

The invention can be implemented as the following forms or application examples.

Application Example 1

According to this application example of the invention, there is provided a physical amount detecting device including: a base portion; one pair of connection arms that extend from the base portion in opposite directions along an X axis; one pair of detection vibration arms that extend from the base portion in opposite directions along a Y axis; one pair of first driving vibration arms that extend from one of the one pair of connection arms in opposite directions along the Y axis; and one pair of second driving vibration arms that extend from the other of the one pair of connection arms in opposite directions along the Y axis. One and the other of the one pair of the first driving vibration arms are bending-vibrated in a Z-axis direction with a first phase, one and the other of the one pair of the second driving vibration arms are bending-vibrated in the Z-axis direction with a second phase that is a reverse phase of the first phase, the one pair of the first driving vibration arms and the one pair of the second driving vibrating arms are vibrated in the Y-axis direction with opposite phases by a Coriolis force that is generated in accordance with angular velocity of X-axis rotation, and one and the other of the one pair of the detection vibration arms are bending-vibrated in the X-axis direction with opposite phases in accordance with vibration of the one pair of the first driving vibration arms and the one pair of the second driving vibration arms in the Y-axis direction.

According to the above-described physical amount detecting device, a double T-type piezoelectric vibrating reed having a thickness in the Z-axis direction is included, and the angular velocity of X-axis rotation can be detected.

Application Example 2

This application example is directed to the physical amount detecting device according to the application example 1, which further includes: first and second driving signal electrodes that are used for performing bending vibration of the first driving vibration arms; first and second driving ground electrodes that are used for performing bending vibration of the first driving vibration arms and form pairs with the first and second driving signal electrodes; third and fourth driving signal electrodes that are used for performing bending vibration of the second driving vibration arms; and third and fourth driving ground electrodes that are used for performing bending vibration of the second driving vibration arms and form pairs with the third and fourth driving signal electrodes. The base portion, the connection arms, the detection vibration arms, and the first and second driving vibration arms configure a piezoelectric vibrating reed, the piezoelectric vibrating reed has a first primary face and a second primary face that are front and rear faces along a plane defined by the X axis and the Y axis, the first driving vibration arm has a first side face that connects the first primary face and the second primary face and a second side face that connects the first primary face and the second primary face and is located on a side opposite to the first side face, the second driving vibration arm has a third side face that connects the first primary face and the second primary face and faces the first side face and a fourth side face that connects the first primary face and the second primary face and is located on a side opposite to the third side face, the first driving signal electrode is formed on the first primary face side of the first side face, the first driving ground electrode is formed on the first primary face side of the second side face, the second driving signal electrode is formed on the second primary face side of the second side face, the second driving ground electrode is formed on the second primary face side of the first side face, the third driving signal electrode is formed on the first primary face side of the third side face, the third driving ground electrode is formed on the first primary face side of the fourth side face, the fourth driving signal electrode is formed on the second primary face side of the fourth side face, the fourth driving ground electrode is formed on the second primary face side of the third side face, the first to fourth driving signal electrodes are electrically connected to each other, and the first to fourth driving ground electrodes are electrically connected to each other.

According to the above-described physical amount detecting device, bending vibration of the first driving vibration arm and the second driving vibration arm in the Z-axis direction can be performed.

Application Example 3

This application example is directed to the physical amount detecting device according to the application example 2, wherein the first driving signal electrode and the first driving ground electrode face each other through the first driving vibration arm, the second driving signal electrode and the second driving ground electrode face each other through the first driving vibration arm, the third driving signal electrode and the third driving ground electrode face each other through the second driving vibration arm, and the fourth driving signal electrode and the fourth driving ground electrode face each other through the second driving vibration arm.

According to the above-described physical amount detecting device, a voltage can be efficiently applied between the driving signal electrode and the driving ground electrode.

Application Example 4

This application example is directed to the physical amount detecting device according to any one of the application examples 1 to 3, which further includes: a detection signal electrode that is used for acquiring a detection signal from the detection vibration arm; and a detection ground electrode that forms a pair with the detection signal electrode. The detection signal electrode is formed on the first primary face and the second primary face of the detection vibration arm, and the detection ground electrode is formed on two side faces connecting the first primary face and the second primary face.

According to the above-described physical amount detecting device, a detection signal according to the bending vibration of the detection vibration arm can be reliably detected.

Application Example 5

According to this application example, there is provided a physical amount detecting apparatus including: the physical amount detecting device according to any one of the application examples 1 to 4; a package in which the physical amount detecting device is housed; and an IC chip that is used for controlling the physical amount detecting device.

According to the above-described physical amount detecting apparatus, the angular velocity of the X-axis rotation can be detected.

Application Example 6

According to this application example, there is provided an electronic apparatus including: the physical amount detecting device according to any one of the application examples 1 to 4.

According to the above-described electronic apparatus, the angular velocity of the X-axis rotation can be detected.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
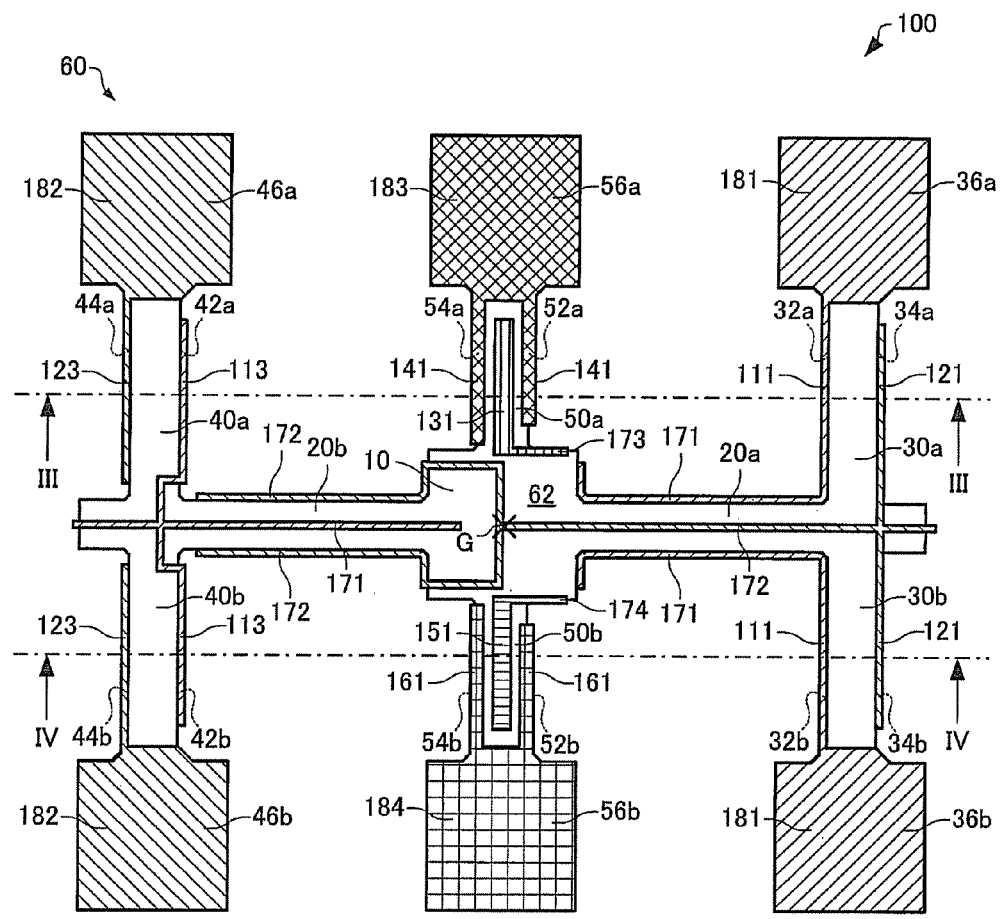
FIG. 1 is a diagram illustrating the configuration of the first primary face side of a physical amount detecting device according to an embodiment of the invention.
Figure 2:
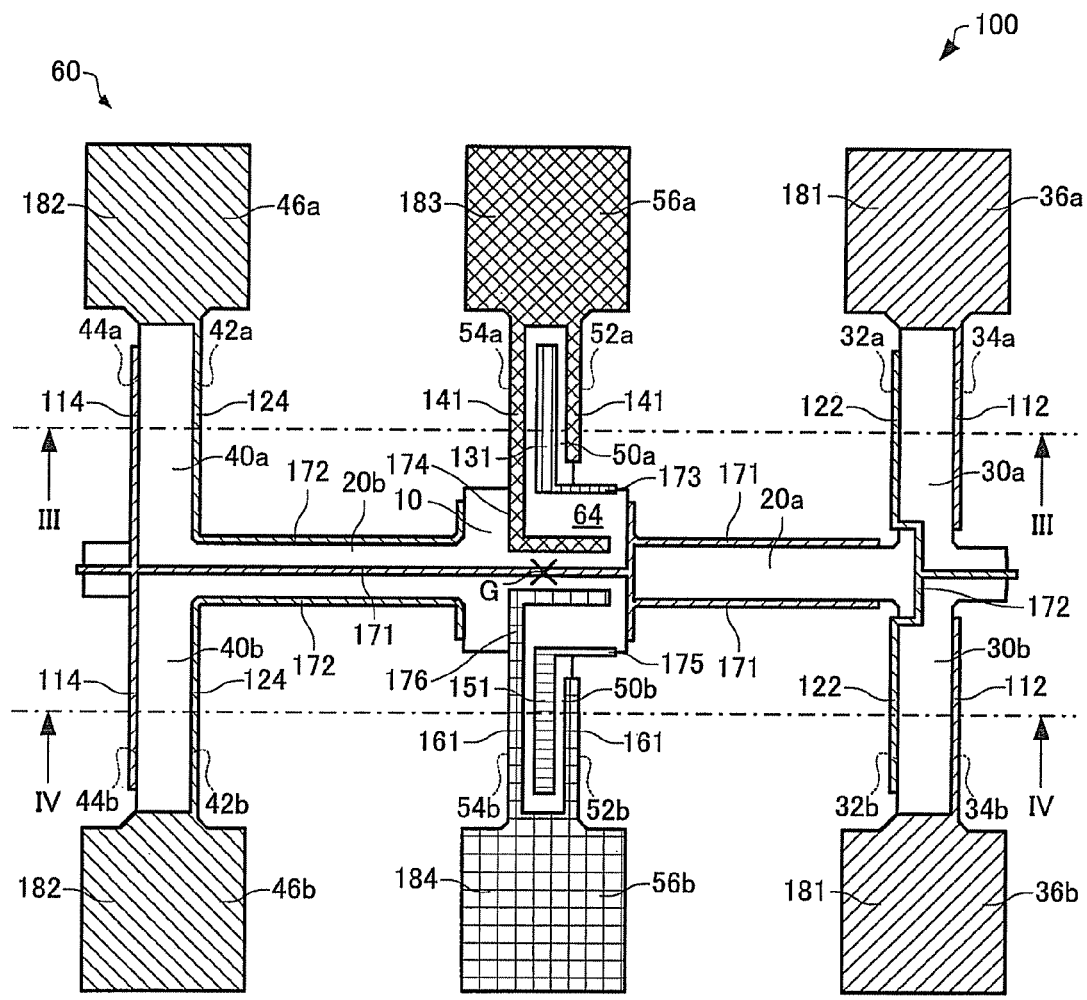
FIG. 2 is a diagram illustrating the configuration of the second primary face side of the physical amount detecting device according to the embodiment.
Figure 3:
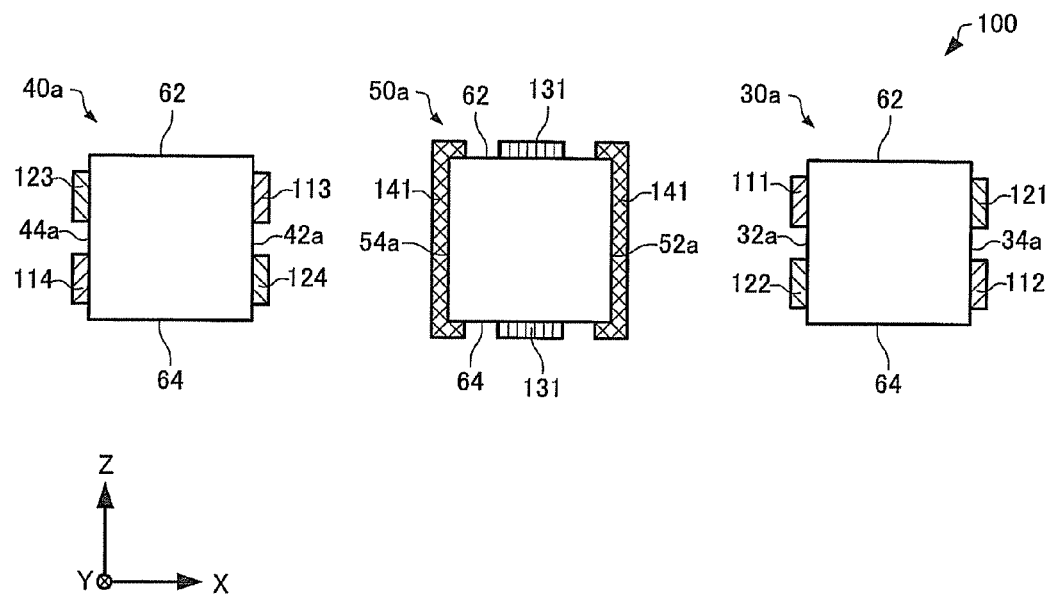
FIG. 3 is a cross-sectional view schematically showing the physical amount detecting device according to the embodiment.
Figure 4:
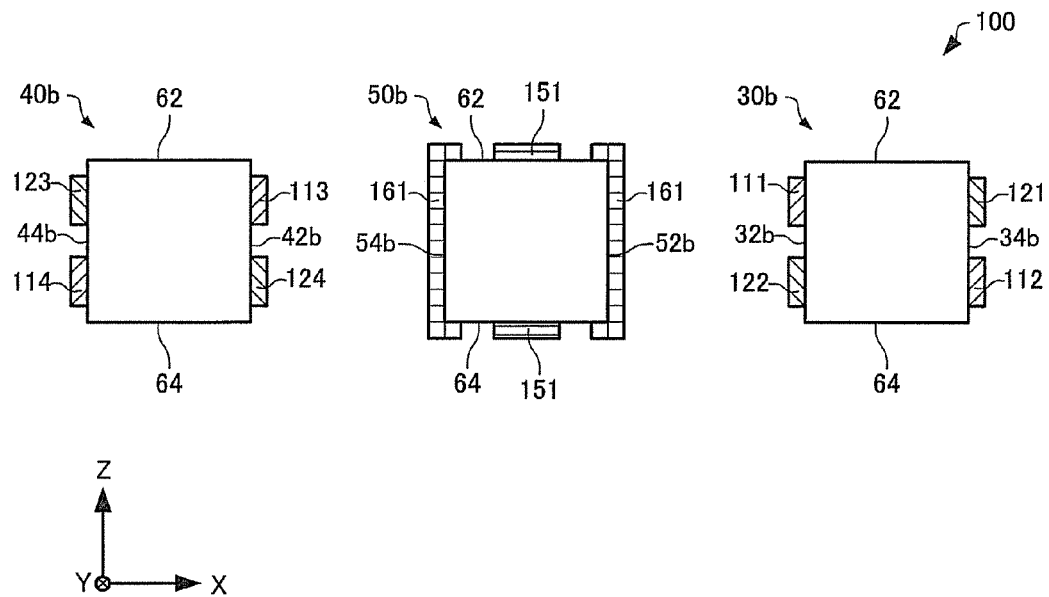
FIG. 4 is a cross-sectional view schematically showing the physical amount detecting device according to the embodiment.

Hereinafter, preferred embodiments of the invention will be described with reference to the accompanying drawings.
1. Physical Amount Detecting Device First, a physical amount detecting device 100 according to an embodiment of the invention will be described with reference to the drawings. FIG. 1 is a plane view of the physical amount detecting device 100 viewed from the first primary face 62 side that is one primary face and is a diagram illustrating the configuration of the first primary face 62 side of the physical amount detecting device 100. FIG. 2 is a perspective view of the physical amount detecting device 100 viewed from the first primary face 62 side and is a diagram illustrating the configuration of the second primary face 64 side that is the other primary face of the physical amount detecting device 100. FIG. 3 is a cross-sectional view schematically showing the physical amount detecting device 100 that is taken along line III-III shown in FIGS. 1 and 2. FIG. 4 is a cross-sectional view schematically showing the physical amount detecting device 100 that is taken along line IV-IV shown in FIGS. 1 and 2.

As shown in FIGS. 1 to 4, the physical amount detecting device 100 includes a piezoelectric vibrating reed 60 and electrodes formed in the piezoelectric vibrating reed 60. Hereinafter, the description will be presented in the order of the piezoelectric vibrating reed 60, the electrodes formed in the piezoelectric vibrating reed 60, and the operation of the piezoelectric vibrating reed 60.
1.1. Piezoelectric Vibrating Reed First, the piezoelectric vibrating reed 60 will be described. As the material of the piezoelectric vibrating reed 60, for example, a piezoelectric single crystal such as crystal, lithium tantalite, or lithium niobate or a piezoelectric material such as a piezoelectric ceramic including zirconate titanate can be used. The piezoelectric vibrating reed 60 may have a structure in which a piezoelectric thin film formed from zinc oxide or aluminum nitride inserted into the electrodes is formed on a part of the surface of a silicon semiconductor.

Hereinafter, an example in which a so-called double T-type piezoelectric vibrating reed formed from a crystal substrate is used as the piezoelectric vibrating reed 60 will be described. The piezoelectric vibrating reed 60 formed from the crystal substrate has a small variance in the resonant frequency according to changes in the temperature, and accordingly, the accuracy of detection of the angular velocity can be improved.

The crystal configuring the crystal substrate has an X axis that is termed an electric axis, a Y axis that is termed a mechanical axis, and a Z axis that is termed an optical axis.

The piezoelectric vibrating reed 60, for example, is formed from a Z-cut crystal substrate that is cut in the direction of the XY plane defined by the X axis and the Y axis. In other words, as shown in FIGS. 1 to 4, the piezoelectric vibrating reed 60 has a thickness in the Z-axis direction, and the planar shape of the piezoelectric vibrating reed 60 is expanded in the XY plane in accordance with the crystal axis of crystal. The piezoelectric vibrating reed 60 has the first primary face 62 and the second primary face 64 that have the relationship of front and rear faces. The first primary face 62 and the second primary face 64 are faces formed along the XY plane.

As shown in FIGS. 1 to 4, the piezoelectric vibrating reed 60 includes: a base portion 10; one pair of connection arms 20a and 20b; one pair of the first driving vibration arms 30a and 30b; one pair of the second driving vibration arms 40a and 40b; and one pair of detection vibration arms 50a and 50b.

The base portion 10 has a center point G of the piezoelectric vibrating reed 60. The center point G can be regarded as a center position of the piezoelectric vibrating reed 60. The piezoelectric vibrating reed 60, for example, has a shape that has point symmetry with respect to the center point G. The shape of the base portion 10 is not particularly limited. For example, the shape of the base portion 10 may be an approximate rectangle having end faces (side faces) parallel to the YZ plane and the XZ plane. From the end face parallel to the YZ plane, the connection arms 20a and 20b can extend, and from the end face parallel to the XZ plane, the detection vibration arms 50a and 50b can extend.

The one pair of the connection arms 20a and 20b extends in opposite directions along the X axis from the base portion 10. In the example shown in the figure, one connection arm 20a extends in the positive X-axis direction (the direction of an arrow in the X axis), and the other connection arm 20b extends in the negative X-axis direction.

The one pair of the first driving vibration arms 30a and 30b, as shown in FIGS. 1 and 2, extends in opposite directions along the Y-axis from near the tip end portion of the connection arm 20a. In the example shown in the figure, one 30a of the first driving vibration arms extends in the positive Y-axis direction (the direction of an arrow in the Y axis), and the other 30b of the first driving vibration arms extends in the negative Y-axis direction. In the example shown in FIGS. 3 and 4, the shape of the cross-sections of the first driving vibration arms 30a and 30b is an approximate rectangle. The first driving vibration arm 30a has the first side face 32a and the second side face 34a that connect the first primary face 62 and the second primary face 64. Similarly, the first driving vibration arm 30b has the first side face 32b and the second side face 34b that connect the first primary face 62 and the second primary face 64. The first side faces 32a and 32b are side faces on the sides of the detection vibration arms 50a and 50b. The second side faces 34a and 34b are side faces on the opposite sides of the first side faces 32a and 32b.

The one pair of the second driving vibration arms 40a and 40b, as shown in FIGS. 1 and 2, extends in opposite directions along the Y-axis from near the tip end portion of the connection arm 20b. In the example shown in the figure, one 40a of the second driving vibration arms extends in the positive Y-axis direction, and the other 40b of the second driving vibration arms extends in the negative Y-axis direction. In the example shown in FIGS. 3 and 4, the shape of the cross-sections of the second driving vibration arms 40a and 40b is an approximate rectangle. The second driving vibration arm 40a has the third side face 42a and the fourth side face 44a that connect the first primary face 62 and the second primary face 64. Similarly, the second driving vibration arm 40b has the third side face 42b and the fourth side face 44b that connect the first primary face 62 and the second primary face 64. The third side faces 42a and 42b are side faces on the sides of the detection vibration arms 50a and 50b and are faces facing the first side faces 32a and 32b. The first side face 32a and the third side face 42a can be regarded as facing each other with the detection vibration arm 50a pinched therebetween. Similarly, the first side face 32b and the third side face 42b can be regarded as facing each other with the detection vibration arm 50b pinched therebetween. The fourth side faces 44a and 44b are faces on the opposite sides of the third side faces 42a and 42b.

The one pair of the detection vibration arms 50a and 50b, as shown in FIGS. 1 and 2, extends in opposite directions along the Y-axis from the base portion 10. In the example shown in the figure, one 50a of the detection vibration arms extends in the positive Y-axis direction, and the other 50b of the detection vibration arms extends in the negative Y-axis direction. In the example shown in FIGS. 3 and 4, the shape of the cross-sections of the detection vibration arms 50a and 50b is an approximate rectangle. The detection vibration arm 50a has the fifth side face 52a and the sixth side face 54a that connect the first primary face 62 and the second primary face 64. Similarly, the detection vibration arm 50b has the fifth side face 52b and the sixth side face 54b that connect the first primary face 62 and the second primary face 64. The fifth side faces 52a and 52b are side faces on the sides of the first driving vibration arms 30a and 30b. The sixth side faces 54a and 54b are side faces on the sides of the second driving vibration arms 40a and 40b and are faces located on the opposite sides of the fifth side faces 52a and 52b.

In addition, the piezoelectric vibrating reed 60, as shown in FIGS. 1 and 2, may include spindle portions 36a, 36b, 46a, 46b, 56a, and 56b. The spindle portions 36a, 36b, 46a, 46b, 56a, and 56b are respectively formed on the tip end portions of the vibration arms 30a, 30b, 40a, 40b, 50a, and 50b. The width (size in the X-axis direction) of the spindle portions 36a, 36b, 46a, 46b, 56a, and 56b is larger than that of the vibration arms 30a, 30b, 40a, 40b, 50a, and 50b. Owing to the spindle portions 36a, 36b, 46a, and 46b formed on the tip end portions of the driving vibration arms 30a, 30b, 40a, and 40b, the physical amount detecting device 100 increases the Coriolis force and can attain a desired resonant frequency with a relatively short (size in the Y-axis direction is small) driving vibration arm. In addition, owing to the spindle portions 56a and 56b formed on the tip end portions of the detection vibration arms 50a and 50b, the electric charge generated in detection signal electrodes 131 and 151 can be increased, and accordingly, the detection sensitivity of the angular velocity can be improved.

The driving vibration arms 30a, 30b, 40a, and 40b, the spindle portions 36a, 36b, 46a, and 46b, and the connection arms 20a and 20b can configure a driving vibration system that drives the piezoelectric vibrating reed 60. In addition, the detection vibration arms 50a and 50b and the spindle portions 56a and 56b can configure a detection vibration system that detects angular velocity. Here, FIGS. 3 and 4 are schematic diagrams, and the cross-sectional shapes are represented as approximate rectangles. However, the cross-sectional shapes are not limited to precise rectangles. In other words, when the piezoelectric vibrating reed 60 is formed by wet etching processing, due to anisotropy of the etching speed, there are cases where the cross-sectional shapes of the first driving vibration arms 30a and 30b, the second driving vibration arms 40a and 40b, and the detection vibration arms 50a and 50b are not precise rectangles, and specific portions of the side faces of the first driving vibration arms 30a and 30b, the second driving vibration arms 40a and 40b, and the detection vibration arms 50a and 50b are convex portions. In addition, a shape in which concave-convex is formed on the first primary face 62 and the second primary face 64 may be used.

1.2. Electrodes

Next, electrodes formed in the piezoelectric vibrating reed 60 will be described. The physical amount detecting device 100, as shown in FIGS. 1 to 4, may include: the first to fourth driving signal electrodes 111, 112, 113, and 114; the first to fourth driving ground electrodes 121, 122, 123, and 124; the first and second detection signal electrodes 131 and 151; and the first and second detection ground electrodes 141 and 161.

(1) First and Second Driving Signal Electrodes 111 and 112 and First and Second Driving Ground Electrodes 121 and 122

The first and second driving signal electrodes 111 and 112 and the first and second driving ground electrodes 121 and 122 are electrodes that are used for performing bending vibration of the first driving vibration arms 30a and 30b. The first driving signal electrode 111 and the first driving ground electrode 121 form one pair, and the second driving signal electrode 112 and the second driving ground electrode 122 form one pair. The driving signal electrodes 111 and 112 are electrodes used for transmitting driving signals to the first driving vibration arms 30a and 30b, and the driving ground electrodes 121 and 122 are electrodes having the ground electric potential.

The first driving signal electrode 111, as shown in FIGS. 3 and 4, is formed on the first primary face 62 side of the first side faces 32a and 32b. The first driving ground electrode 121 is formed on the first primary face 62 side of the second side faces 34a and 34b.

The first driving signal electrode 111 and the first driving ground electrode 121, for example, face each other through the first driving vibration arm 30a or the first driving vibration arm 30b. Accordingly, there is an advantage that a voltage can be efficiently applied between the first driving signal electrode 111 and the first driving ground electrode 121. This advantage will be described below. This applies the same to the driving signal electrode and the driving ground electrode facing each other.

The second driving signal electrode 112 is formed on the second primary face 64 side of the second side faces 34a and 34b. The second driving ground electrode 122 is formed on the second primary face 64 side of the first side faces 32a and 32b. The second driving signal electrode 112 and the second driving ground electrode 122, for example, face each other through the first driving vibration arm 30a or the first driving vibration arm 30b.

The driving signal electrodes 111 and 112, as shown in FIGS. 1 and 2, may be connected to the first spindle portion electrode 181 that is formed in the spindle portions 36a and 36b. The first spindle portion electrode 181 may be formed on the entire faces of the spindle portions 36a and 36b.

(2) Third and Fourth Driving Signal Electrodes 113 and 114 and Third and Fourth Driving Ground Electrodes 123 and 124

The third and fourth driving signal electrodes 113 and 114 and the third and fourth driving ground electrodes 123 and 124 are electrodes that are used for performing bending vibration of the second driving vibration arms 40a and 40b. The third driving signal electrode 113 and the third driving ground electrode 123 form one pair, and the fourth driving signal electrode 114 and the fourth driving ground electrode 124 form one pair. The driving signal electrodes 113 and 114 are electrodes used for transmitting driving signals to the second driving vibration arms 40a and 40b, and the driving ground electrodes 123 and 124 are electrodes having the ground electric potential.

The third driving signal electrode 113, as shown in FIGS. 3 and 4, is formed on the first primary face 62 side of the third side faces 42a and 42b. The third driving ground electrode 123 is formed on the first primary face 62 side of the fourth side faces 44a and 44b. The third driving signal electrode 113 and the third driving ground electrode 123, for example, face each other through the second driving vibration arm 40a or the second driving vibration arm 40b.

The fourth driving signal electrode 114 is formed on the second primary face 64 side of the fourth side faces 44a and 44b. The fourth driving ground electrode 124 is formed on the second primary face 64 side of the third side faces 42a and 42b. The fourth driving signal electrode 114 and the fourth driving ground electrode 124, for example, face each other through the second driving vibration arm 40a or the second driving vibration arm 40b.

The driving ground electrodes 123 and 124, as shown in FIGS. 1 and 2, may be connected to the second spindle portion electrode 182 that is formed in the spindle portions 46a and 46b. The second spindle portion electrode 182 may be formed on the entire faces of the spindle portions 46a and 46b.

(3) Wirings 171 and 172

As shown in FIGS. 1 and 2, the physical amount detecting device 100 may further include a wiring 171 and a wiring 172.

The driving signal electrodes 111 to 114 are electrically connected to each other through the wiring 171. The wiring 171 is formed in the connection arms 20a and 20b and the base portion 10. In the example shown in the figure, the wiring 171 is formed on the side face (a face connecting the first primary face 62 and the second primary face 64) of the connection arm 20a, the side face of the base portion 10, the second primary face 64 of the base portion 10, and the first primary face 62 and the second primary face 64 of the connection arm 20b.

The driving ground electrodes 121 to 124 are electrically connected to each other through the wiring 172. The wiring 172 is formed in the connection arms 20a and 20b and the base portion 10. In the example shown in the figure, the wiring 172 is formed on the first primary face 62 and the second primary face 64 of the connection arm 20a, the side face of the base portion 10, the first primary face 62 of the base portion 10, and the side face of the connection arm 20b.

The wirings 171 and 172, for example, are electrically connected to a driving circuit (to be described in detail later). Accordingly, a diving signal can be applied by applying a voltage between the driving signal electrodes 111 to 114 and the driving ground electrodes 121 to 124 from the driving circuit.

(4) First Detection Signal Electrode 131 and First Detection Ground Electrode 141

The first detection signal electrode 131 and the first detection ground electrode 141 are electrodes that are used for acquiring a detection signal of the detection vibration arm 50a. In other words, the vibration generated in the detection vibration arm 50a appears as electric charge in the first detection signal electrode 131 and can be extracted as a detection signal by a detection circuit (it will be described in detail later). The first detection ground electrode 141 can have the ground electric potential.

The first detection signal electrode 131, as shown in FIG. 3, is formed on the first primary face 62 and the second primary face 64 of the detection vibration arm 50a. The first detection signal electrode 131 formed on the first primary face 62 and the first detection signal electrode 131 formed on the second primary face 64, for example, face each other through the detection vibration arm 50a.

The first detection signal electrode 131, as shown in FIGS. 1 and 2, may be connected to the wiring 173 that is formed on the side face of the base portion 10.

The first detection ground electrode 141, as shown in FIG. 3, is formed on the fifth side face 52a and the sixth side face 54a. As shown in the figure, a part of the first detection ground electrode 141 may be formed also on the first primary face 62 and the second primary face 64. The first detection ground electrode 141 formed on the fifth side face 52a and the first detection ground electrode 141 formed on the sixth side face 54a, for example, face each other through the detection vibration arm 50a.

The first detection ground electrode 141, as shown in FIGS. 1 and 2, may be connected to the third spindle portion electrode 183 formed in the spindle portion 56a. The third spindle portion electrode 183 may be formed on the entire face of the spindle portion 56a. In addition, the first detection ground electrode 141, as shown in FIG. 2, may be connected to the wiring 174 that is formed on the second primary face 64 of the base portion 10.

(5) Second Detection Signal Electrode 151 and Second Detection Ground Electrode 161

The second detection signal electrode 151 and the second detection ground electrode 161 are electrodes that are used for acquiring a detection signal of the detection vibration arm 50b. In other words, the vibration generated in the detection vibration arm 50b appears as electric charge in the second detection signal electrode 151 and can be extracted as a detection signal by the detection circuit. The second detection ground electrode 161 can have the ground electric potential.

The second detection signal electrode 151, as shown in FIG. 4, is formed on the first primary face 62 and the second primary face 64 of the detection vibration arm 50b. The second detection signal electrode 151 formed on the first primary face 62 and the second detection signal electrode 151 formed on the second primary face 64, for example, face each other through the detection vibration arm 50b.

The second detection signal electrode 151, as shown in FIGS. 1 and 2, may be connected to a wiring 175 that is formed on the side face of the base portion 10.

The second detection ground electrode 161, as shown in FIG. 4, is formed on the fifth side face 52b and the sixth side face 54b. As shown in the figure, a part of the second detection ground electrode 161 may be formed also on the first primary face 62 and the second primary face 64. The second detection ground electrode 161 formed on the fifth side face 52b and the second detection ground electrode 161 formed on the sixth side face 54b, for example, face each other through the detection vibration arm 50b.

The second detection ground electrode 161, as shown in FIGS. 1 and 2, may be connected to the fourth spindle portion electrode 184 formed in the spindle portion 56b. The fourth spindle portion electrode 184 may be formed on the entire face of the spindle portion 56b. In addition, the second detection ground electrode 161, as shown in FIG. 2, may be connected to the wiring 176 that is formed on the second primary face 64 of the base portion 10.

The above-described wirings 173, 174, 175, and 176, for example, are electrically connected to the detection circuit. Accordingly, the detection circuit can acquire detection signals from the detection signal electrodes 131 and 151.

In addition, as the electrodes 111 to 114, 121 to 124, 131, 141, 151, 161, and 181 to 184 and wirings 171 to 176, for example, a laminated body that is laminated in the order of chromium and gold from the piezoelectric vibrating reed 60 side or the like can be used. The electrodes 111 to 114, 121 to 124, 131, 141, 151, 161, and 181 to 184 and wirings 171 to 176, for example, are formed by patterning a conductive layer (not shown in the figure), which is formed as a film by a sputtering method or the like, using photolithographic technology, etching technology, and the like. For example, the electrodes 111 to 114, 121 to 124, and the like that are formed on side faces are formed by patterning using diagonal exposure or the like.

1.3. Operation of Piezoelectric Vibrating Reed

Next, the operation of the piezoelectric vibrating reed 60 will be described. FIGS. 5 to 8 are diagrams illustrating the operation of the piezoelectric vibrating reed 60.

First, in order to perform bending vibration of the driving vibration arms 30a, 30b, 40a, and 40b, an AC voltage is applied between the driving signal electrodes 111 to 114 and the driving ground electrodes 121 to 124 as a driving signal. More specifically, for example, as shown in FIGS. 3 and 4, between the first driving signal electrode 111 and the first driving ground electrode 121, between the second driving signal electrode 112 and the second driving ground electrode 122, between the third driving signal electrode 113 and the third driving ground electrode 123, and between the fourth driving signal electrode 114 and the fourth driving ground electrode 124, an AC voltage is applied.

Figure 5:
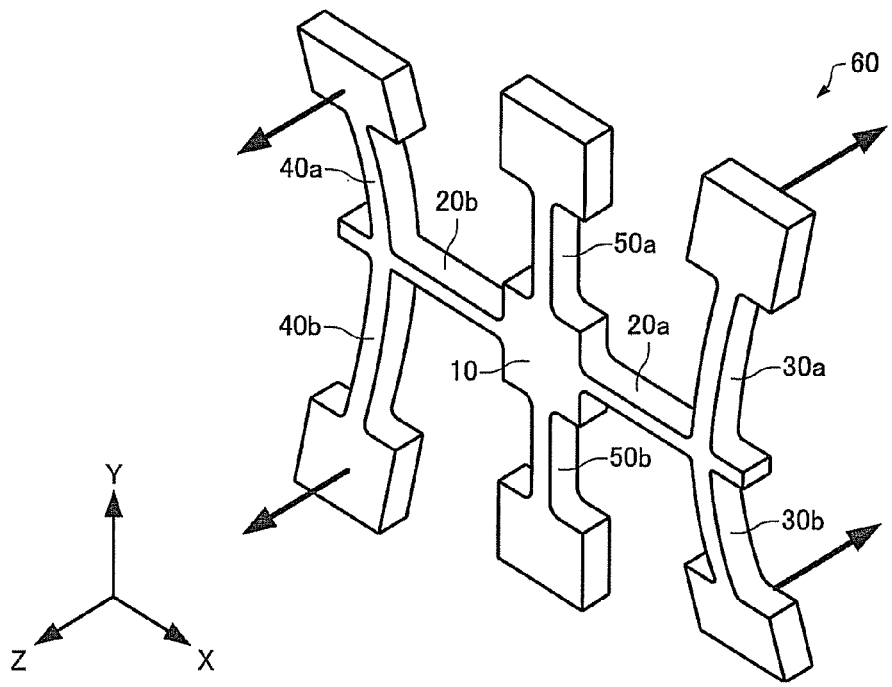
FIG. 5 is a diagram showing the operation of a piezoelectric vibrating reed of the physical amount detecting device according to the embodiment.

For example, in a case where a positive voltage is applied to the driving signal electrodes 111 to 114 with respect to the driving ground electrodes 121 to 124, by the first driving vibration arms 30a and 30b, an electric field is generated toward the positive X direction on the first primary face 62 side, and an electric field is generated toward the negative X direction on the second primary face 64 side. Similarly, by the second driving vibration arms 40a and 40b, an electric field is generated toward the negative X direction on the first primary face 62 side, and an electric field is generated toward the positive X direction on the second primary face 64 side. Accordingly, as shown in FIG. 5, the first driving vibration arms 30a and 30b are bent in the negative Z-axis direction with the connection arm 20a used as a support portion, and the second driving vibration arms 40a and 40b are bent in the positive Z-axis direction (the direction facing from the plane of the sheet) with the connection arm 20b used as a support portion.

Figure 6:
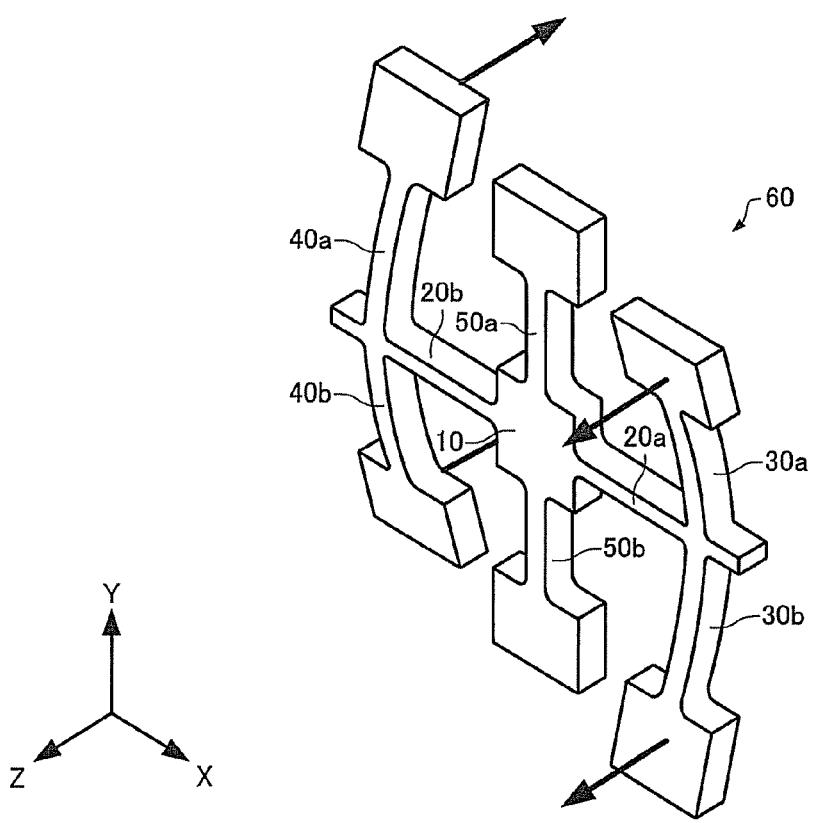
FIG. 6 is a diagram illustrating the operation of the piezoelectric vibrating reed of the physical amount detecting device according to the embodiment.

In contrast to the above-described example, for example, in a case where a negative voltage is applied to the driving signal electrodes 111 to 114 with respect to the driving ground electrodes 121 to 124, by the first driving vibration arms 30a and 30b, an electric field is generated toward the negative X direction on the first primary face 62 side, and an electric field is generated toward the positive X direction on the second primary face 64 side. Similarly, by the second driving vibration arms 40a and 40b, an electric field is generated toward the positive X direction on the first primary face 62 side, and an electric field is generated toward the negative X direction on the second primary face 64 side. Accordingly, as shown in FIG. 6, the first driving vibration arms 30a and 30b are bent in the positive Z-axis direction with the connection arm 20a used as a support portion, and the second driving vibration arms 40a and 40b are bent in the negative Z-axis direction with the connection arm 20b used as a support portion.

As above, in accordance with change in the polarity of the AC voltage applied to the driving signal electrodes 111 to 114, the first driving vibration arms 30a and 30b are in the state of bending vibration in the Z-axis direction with the first phase, and the second driving vibration arms 40a and 40b are in the state of bending vibration in the Z-axis direction with the second phase that is a phase opposite to the first phase.

Figure 7:
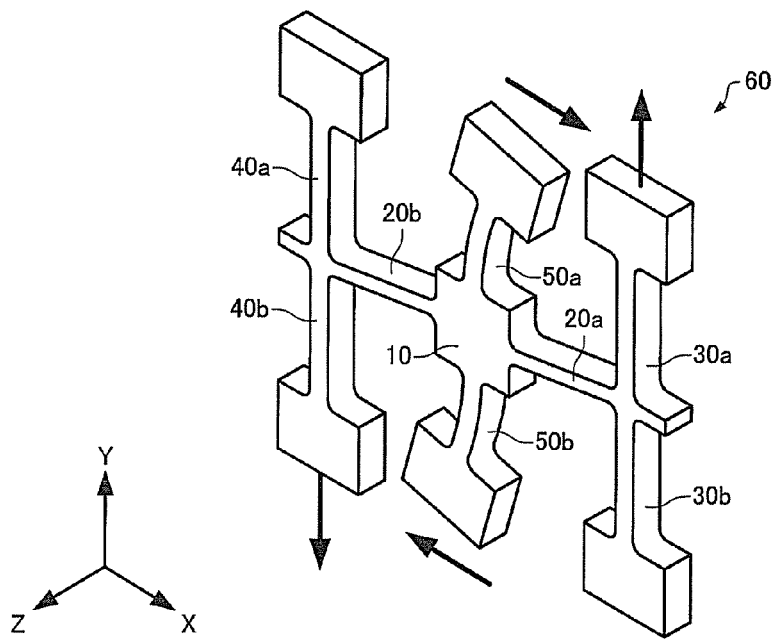
FIG. 7 is a diagram illustrating the operation of the piezoelectric vibrating reed of the physical amount detecting device according to the embodiment.
Figure 8:
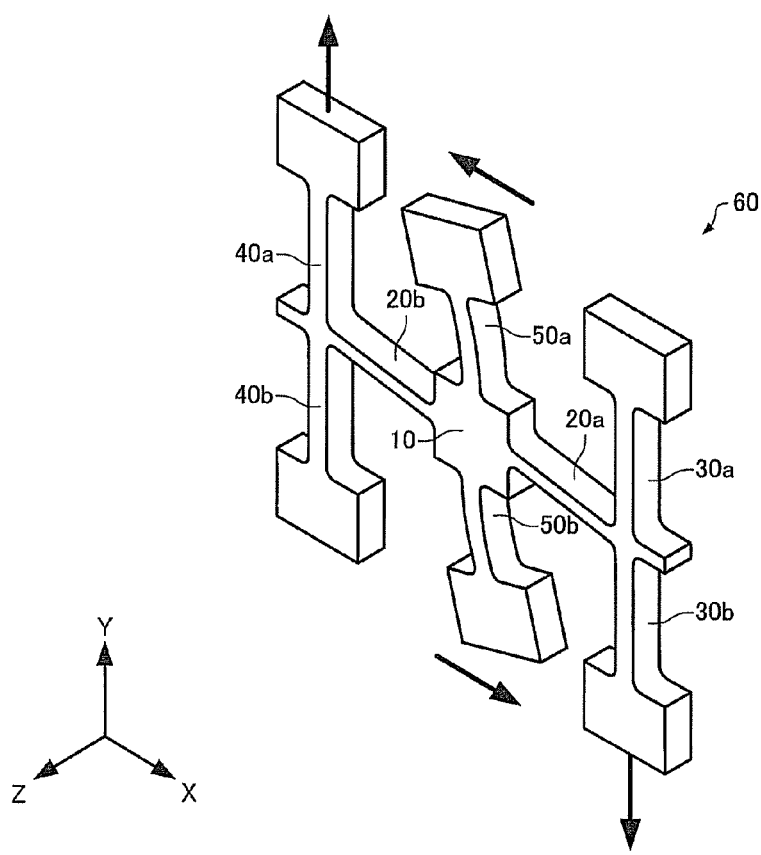
FIG. 8 is a diagram illustrating the operation of the piezoelectric vibrating reed of the physical amount detecting device according to the embodiment.

Here, when the angular velocity using the X axis as its rotation axis is applied to the piezoelectric vibrating reed 60, the driving vibration arms 30a, 30b, 40a, and 40b obtain a Coriolis force in a direction perpendicular to both the Z axis, which is the direction of the bending vibration, and the X axis, which is the rotation axis, that is, the Y-axis direction. As a result, as shown in FIGS. 7 and 8, the connection arm 20a and the connection arm 20b are in the state of bending vibration in the Y-axis direction with opposite phases with the base portion 10 used as the support portion. In accordance with the bending vibration of the connection arms 20a and 20b, the first driving vibration arms 30a and 30b and the second driving vibration arms 40a and 40b are vibrated in the Y-axis direction with opposite phases. Then, the first detection vibration arm 50a and the second detection vibration arm 50b are in the state of bending vibration in the X-axis direction with opposite phases with the base portion 10 used as a support portion, by being interlocked with the vibration of the connection arms 20a and 20b and the driving vibration arms 30a, 30b, 40a, and 40b.

According to the bending vibration of the detection vibration arms 50a and 50b, electric charge is generated in the detection signal electrodes 131 and 151. The electric charge changes in accordance with the magnitude (that is, the magnitude of the angular velocity participating to the piezoelectric vibrating reed 60) of the Coriolis force. Accordingly, by acquiring the electric charge as a detection signal, the angular velocity of the X-axis rotation can be detected.

In addition, the physical amount detecting device 100 can detect not only the angular velocity of the X-axis rotation but also the angular acceleration of the X-axis rotation.

2. Physical Amount Detecting Apparatus

Figure 9:
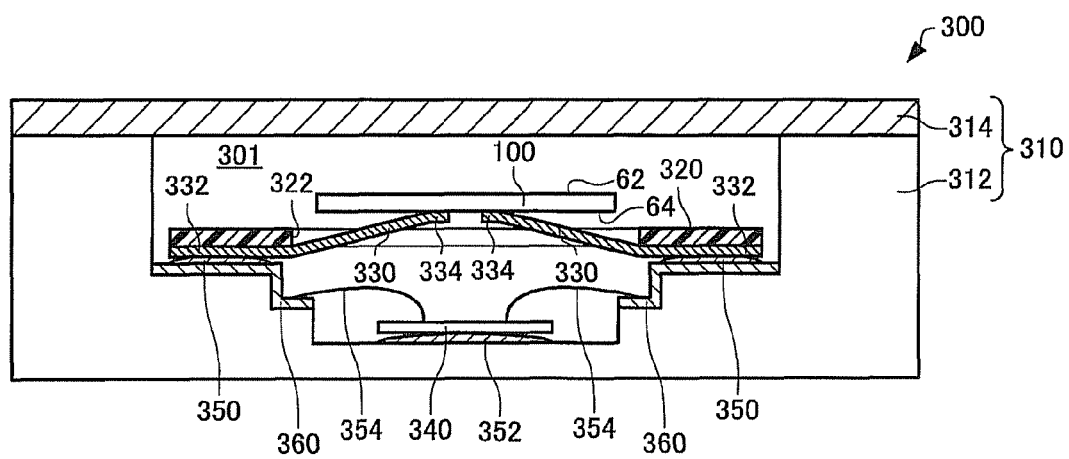
FIG. 9 is a cross-sectional view schematically showing a physical amount detecting apparatus according to an embodiment of the invention.
Figure 10:
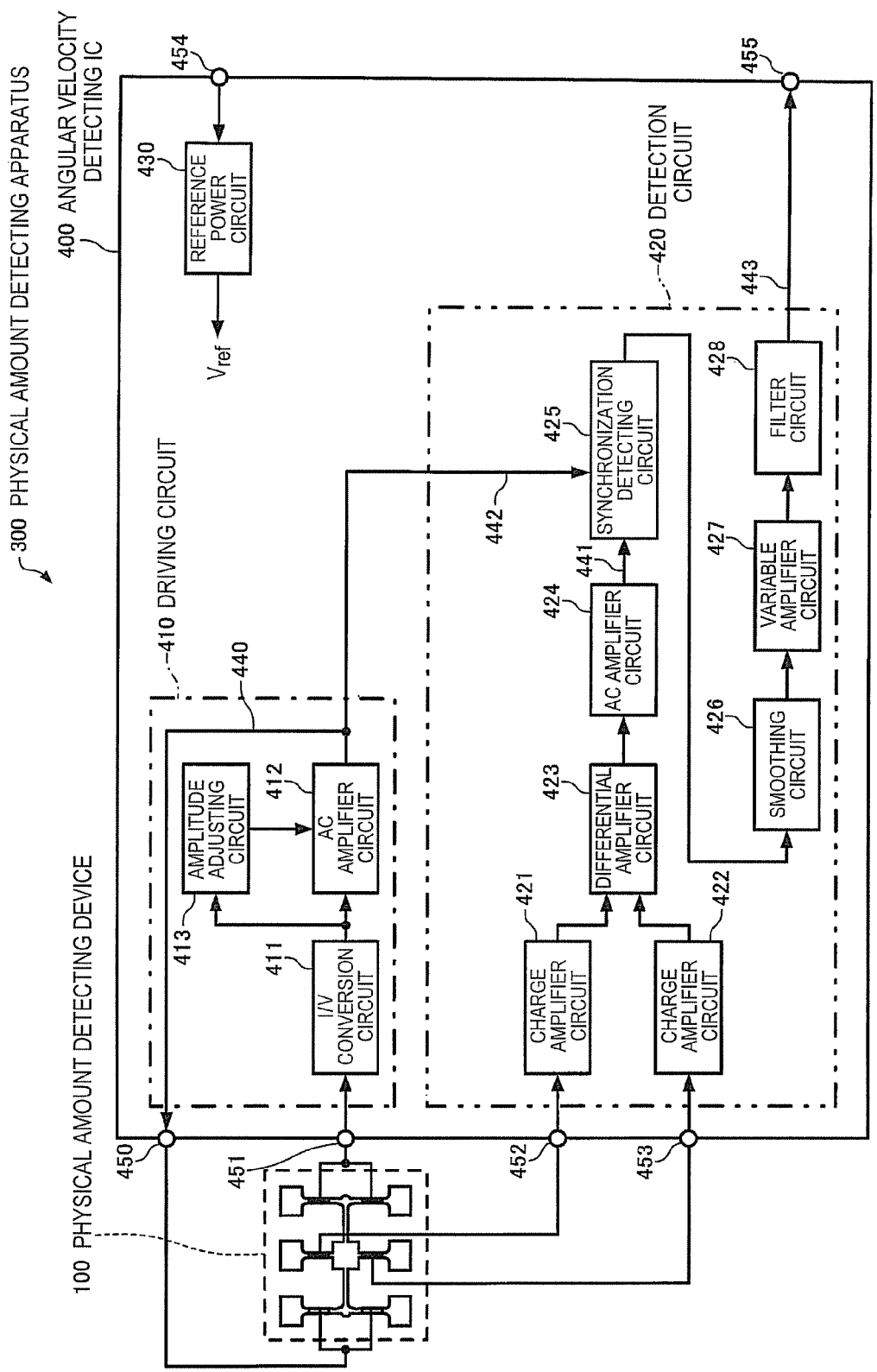
FIG. 10 is a diagram illustrating the configuration of the physical amount detecting apparatus according to the embodiment.

Next, a physical amount detecting apparatus 300 according to this embodiment will be described with reference to drawings. FIG. 9 is a cross-sectional view schematically showing the physical amount detecting apparatus 300. FIG. 10 is a diagram illustrating the configuration of the physical amount detecting apparatus 300. In FIGS. 9 and 10, the physical amount detecting device 100 is shown in a simplified manner.

The physical amount detecting apparatus 300 may include: a package 310 having a physical amount detecting device (for example, the physical amount detecting device 100) according to an embodiment of the invention, a package base 312, and a lead 314; a support substrate 320; a lead 330; and an IC chip 340.

The package base 312 may have an opening and can house the physical amount detecting device 100 inside the opening. As examples of the material of the package base 312, there are ceramic, glass, and the like.

The lead 314 is disposed on the package base 312 and seals the opening of the package base 312. As examples of the material of the lead 314, there are metal such as 42 alloy (alloy of iron containing 42% nickel) or kovar (alloy of iron, nickel, and cobalt), ceramic, and glass. A cavity 301 that is formed by the package base 312 and the lead 314 becomes a space that is used for the operation of the physical amount detecting device 100. The cavity 301 can be sealed and can be formed in a decompressed space or in inactive gas atmosphere.

The support substrate 320 is housed inside the package 310. As the material of the support substrate 320, for example, a resin such as polyimide can be used. The support substrate 320 is fixed inside the package 310 through the lead 330. The support substrate 320 may have a through hole 322 that is formed through from the upper face of the support substrate 320 to the lower face.

The lead 330 is housed inside the package 310. As examples of the material of the lead 330, there are copper, gold, nickel, and an alloy thereof. In the example shown in the figure, the lead 330 extends from the lower face side of the end portion of the support substrate 320 to the side of the upper face of the support substrate 320 through the through hole 322. The upper face of one end portion 332 of the lead 330, for example, is bonded to the lower face of the support substrate 320 using an adhesive agent. The lower face of the one end portion 332, for example, is bonded to the connection wiring 360, which is formed on the inner face of the package 310, with a soldering material 350. The upper face of the other end portion 334 of the lead 330 is bonded to the physical amount detecting device 100, for example, by thermal compression. Although not shown in the figure, a plurality of the leads 330 may be disposed in correspondence with the wirings 171 to 176 of the physical amount detecting device 100 and be electrically connected to the wirings 171 to 176 formed in the base portion 10.

The physical amount detecting device 100 is supported at the upper side of the support substrate 320 by the lead 330. In the example shown in the figure, the physical amount detecting device 100 is supported such that the first primary face 62 faces the lower face of the lead 314, and the second primary face 64 faces the inner face (inner lower face) of the package base 312.

The IC chip 340 is fixed to the package base 312, for example, by a soldering material 352. The IC chip 340 is a chip that is used for controlling the physical amount detecting device 100. The IC chip 340 is electrically connected to the connection wiring 360 that is formed in the package base 312, for example, through a wire 354. Accordingly, the wirings 171 to 176 of the physical amount detecting device 100 are electrically connected to the IC chip 340. Although not shown in the figure, the IC chip 340 may be disposed outside the package 310. In the IC chip 340, an angular velocity detecting IC 400 is built.

The angular velocity detecting IC 400, as shown in FIG. 10, may include a driving circuit 410, a detection circuit 420, and a reference power circuit 430.

The driving circuit 410 may include an I/V conversion circuit (current-to-voltage converting circuit) 411, an AC amplifier circuit 412, and an amplitude adjusting circuit 413.

A driving current flowing through the piezoelectric vibrating reed of the physical amount detecting device 100 is converted into an AC voltage signal by the I/V conversion circuit 411.

The AC voltage signal output from the I/V conversion circuit 411 is input to the AC amplifier circuit 412 and the amplitude adjusting circuit 413. The AC amplifier circuit 412 amplifies the input AC voltage signal, clips the amplified AC voltage signal at a predetermined voltage value, and outputs a rectangular wave voltage signal 440. The amplitude adjusting circuit 413 controls the AC amplifier circuit 412 so as to maintain the driving current to be constant by changing the amplitude of the rectangular wave voltage signal 440 in accordance with the level of the AC voltage signal output by the I/V conversion circuit 411.

The rectangular wave voltage signal 440 is supplied to the driving signal electrodes 111 to 114 of the physical amount detecting device 100 through an external output terminal 450. As above, the physical amount detecting device 100 continuously excites predetermined driving vibration as shown in FIGS. 5 and 6. In addition, by maintaining the driving current to be constant, the driving vibration arms 30a, 30b, 40a, and 40b of the physical amount detecting device 100 can acquire constant vibration speed. Accordingly, the vibration speed that becomes the source for generating a Coriolis force is constant, and therefore the sensitivity can be further stabilized.

Here, the driving circuit 410 serves as a driving unit according to an embodiment of the invention.

The detection circuit 420 may include: charge amplifier circuits 421 and 422; a differential amplifier circuit 423; an AC amplifier circuit 424; a synchronization detecting circuit 425; a smoothing circuit 426; a variable amplifier circuit 427; and a filter circuit 428.

An AC electric charge, which is a detection signal transmitted from the first detection signal electrode 131 of the physical amount detecting device 100, is input to the charge amplifier circuit 421 through an external input terminal 452.

Similarly, an AC electric charge, which is a detection signal transmitted from the second detection signal electrode 151 of the physical amount detecting device 100, is input to the charge amplifier circuit 422 through an external input terminal 453.

These charge amplifier circuits 421 and 422 convert the respective input AC electric charge into AC voltage signals with a reference voltage $V_{ref}$ used as a reference. Here, the reference voltage $V_{ref}$ is generated based on an external power source input from the power input terminal 454 by the reference power circuit 430.

The differential amplifier circuit 423 performs differential amplification for the output signal of the charge amplifier circuit 421 and the output signal of the charge amplifier circuit 422. The differential amplifier circuit 423 is used for eliminating the same-phase component and adding and amplifying opposite-phase components.

The AC amplifier circuit 424 amplifies the output signal of the differential amplifier circuit 423 and inputs the amplified output signal to the synchronization detecting circuit 425 as a signal 441 to be detected.

The synchronization detecting circuit 425 performs synchronization detection for the signal 441 to be detected by using a detection signal 442.

The output signal of the synchronization detecting circuit 425 is smoothed into a DC voltage signal by the smoothing circuit 426 and is input to the variable amplifier circuit 427.

The variable amplifier circuit 427 adjusts the detection sensitivity by amplifying (or attenuating) the output signal (the DC voltage signal) of the smoothing circuit 426 at an amplification rate (or an attenuation rate) that is set. The signal amplified (or attenuated) by the variable amplifier circuit 427 is input to the filter circuit 428.

The filter circuit 428 is a circuit that limits the output signal of the variable amplifier circuit 427 to a frequency band that is appropriate for the use and generates an angular velocity detection signal 443. Then, the angular velocity detection signal 443 is externally output through an external output terminal 455.

As above, the physical amount detecting apparatus 300 can detect the angular velocity. The voltage value of the angular velocity detection signal 443 is in proportion to the magnitude of the Coriolis force (the magnitude of the angular velocity), and the polarity of the angular velocity detection signal 443 is determined based on the rotation direction. Accordingly, the angular velocity applied to the physical amount detecting apparatus 300 can be calculated based on the angular velocity detection signal 443.

3. Electronic Apparatus

A physical amount detecting device according to an embodiment of the invention or a physical amount detecting apparatus according to an embodiment of the invention can be appropriately used in electronic apparatuses such as a digital still camera, a video camera, a navigation system, a pointing device, a game controller, and a cellular phone. Thus, in any of the case, an electronic apparatus having the advantages described in the above-described embodiments can be provided.

As described above, although the embodiments of the invention have been described in detail, it can be easily understood by those skilled in the art that various changes can be made therein without substantially departing from a new matter and advantages of the invention. Therefore, such modified examples belong to the scope of the invention. The entire disclosure of Japanese Patent Application No. 2010-016505, filed on Jan. 28, 2010 and Japanese Patent Application No. 2010-237413, filed on Oct. 22, 2010 are expressly incorporated by reference herein.

What is claimed is:

1. A physical amount detecting device comprising:
    a base portion;
    one pair of connection arms that extend from the base portion in opposite directions along an X axis;
    one pair of detection vibration arms that extend from the base portion in opposite directions along a Y axis;
    one pair of first driving vibration arms that extend from one of the one pair of connection arms in opposite directions along the Y axis, the one pair of first driving arms being bendable in a Z-axis direction with a first phase;
    one pair of second driving vibration arms that extend from the other of the one pair of connection arms in opposite directions along the Y axis, the one pair of second driving vibration arms being bendable in the Z-axis direction with a second phase that is a reverse phase of the first phase;
    first and second driving signal electrodes that are used for performing bending vibration of the first driving vibration arms;
    first and second driving ground electrodes that are used for performing bending vibration of the first driving vibration arms and form pairs with the first and second driving signal electrodes;
    third and fourth driving signal electrodes that are used for performing bending vibration of the second driving vibration arms; and
    third and fourth driving ground electrodes that are used for performing bending vibration of the second driving vibration arms and form pairs with the third and fourth driving signal electrodes,
    wherein the base portion, the connection arms, the detection vibration arms, and the first and second driving vibration arms configure a piezoelectric vibrating reed,
    wherein the piezoelectric vibrating reed has a first primary face and a second primary face that are front and rear faces along a plane defined by the X axis and the Y axis,
    wherein each of the first driving vibration arms has a first side face that connects the first primary face and the second primary face and a second side face that connects the first primary face and the second primary face and is located on a side opposite to the first side face,
    wherein each of the second driving vibration arms has a third side face that connects the first primary face and the second primary face and faces the first side face and a fourth side face that connects the first primary face and the second primary face and is located on a side opposite to the third side face,
    wherein the first driving signal electrode is formed on the first primary face side of the first side face,
    wherein the first driving ground electrode is formed on the first primary face side of the second side face,
    wherein the second driving signal electrode is formed on the second primary face side of the second side face, wherein the second driving ground electrode is formed on the second primary face side of the first side face, wherein the third driving signal electrode is formed on the first primary face side of the third side face, wherein the third driving ground electrode is formed on the first primary face side of the fourth side face, wherein the fourth driving signal electrode is formed on the second primary face side of the fourth side face, wherein the fourth driving ground electrode is formed on the second primary face side of the third side face, wherein the first to fourth driving signal electrodes are electrically connected to each other, and wherein the first to fourth driving ground electrodes are electrically connected to each other.

2. The physical amount detecting device according to claim 1, wherein the first driving signal electrode and the first driving ground electrode face each other through the first driving vibration arm, wherein the second driving signal electrode and the second driving ground electrode face each other through the first driving vibration arm, wherein the third driving signal electrode and the third driving ground electrode face each other through the second driving vibration arm, and wherein the fourth driving signal electrode and the fourth driving ground electrode face each other through the second driving vibration arm.

3. The physical amount detecting device according to claim 1, further comprising:

a detection signal electrode that is used for acquiring a detection signal from the detection vibration arm; and a detection ground electrode that forms a pair with the detection signal electrode, wherein the detection signal electrode is formed on the first primary face and the second primary face of the detection vibration arm, and wherein the detection ground electrode is formed on two side faces connecting the first primary face and the second primary face.

4. A physical amount detecting apparatus comprising:

the physical amount detecting device according to claim 1;

a package in which the physical amount detecting device is housed; and an IC chip that is used for controlling the physical amount detecting device.

* * * * *